(12) United States Patent
An et al.

(10) Patent No.: US 11,625,142 B2
(45) Date of Patent: Apr. 11, 2023

(54) USER EQUIPMENT AND CONTROL METHOD FOR THE SAME

(71) Applicants: Hyundai Motor Company, Seoul (KR); Kia Corporation, Seoul (KR)

(72) Inventors: Rowoon An, Seoul (KR); Jae Yul Woo, Seoul (KR); Seunghyun Woo, Seoul (KR); Soobin Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/643,107

(22) Filed: Dec. 7, 2021

(65) Prior Publication Data

US 2022/0253203 A1    Aug. 11, 2022

(30) Foreign Application Priority Data

Feb. 8, 2021    (KR) ......................... 10-2021-0017718

(51) Int. Cl.
| | |
|---|---|
| G06F 3/04817 | (2022.01) |
| G06F 3/0482 | (2013.01) |
| G06F 3/04886 | (2022.01) |
| H04N 5/232 | (2006.01) |
| H04N 5/272 | (2006.01) |

(52) U.S. Cl.
CPC ........ G06F 3/04817 (2013.01); G06F 3/0482 (2013.01); G06F 3/04886 (2013.01); H04N 5/23293 (2013.01); H04N 5/272 (2013.01)

(58) Field of Classification Search
CPC .............. G06F 3/04817; G06F 3/0482; G06F 3/04886; H04N 5/23293; H04N 5/272
See application file for complete search history.

(56) References Cited

U.S. PATENT DOCUMENTS

| | | | | |
|---|---|---|---|---|
| 9,269,011 | B1* | 2/2016 | Sikka | .................... G06V 20/20 |
| 9,412,202 | B2* | 8/2016 | Sako | .................. H04N 1/00244 |
| 9,557,951 | B2* | 1/2017 | Bean | ..................... G06V 20/20 |
| 9,619,940 | B1* | 4/2017 | Lotto | .................... G06T 19/006 |
| 9,710,970 | B2* | 7/2017 | Jung | .................... G06T 19/006 |
| 9,891,070 | B2* | 2/2018 | Park | ..................... G06F 3/0488 |
| 10,055,895 | B2* | 8/2018 | Li | .......................... H04L 51/52 |
| 10,147,399 | B1* | 12/2018 | Mott | ..................... G06V 20/10 |
| 10,484,673 | B2* | 11/2019 | Jin | ...................... G06F 3/03545 |
| 10,783,554 | B1* | 9/2020 | Hylton | .................. G06V 20/20 |
| 10,871,377 | B2* | 12/2020 | Yu | ........................ G06T 19/003 |
| 10,878,629 | B2* | 12/2020 | Ishikawa | .................. G06T 7/70 |
| 11,412,350 | B2* | 8/2022 | Mayor | ............... G01C 21/3647 |
| 2011/0161875 | A1* | 6/2011 | Kankainen | ........... G06F 3/0481 715/810 |

(Continued)

Primary Examiner — Daeho D Song
(74) Attorney, Agent, or Firm — Slater Matsil, LLP

(57) ABSTRACT

An embodiment user equipment includes an image sensor, a user interface configured to display an image photographed by the image sensor and to receive a user input, a location detection sensor configured to detect a location of the user equipment, and a controller configured to identify a point of interest (POI) located in a shooting direction of the image sensor based on an output of the location detection sensor, control the user interface to display an augmented reality (AR) icon corresponding to the POI by superimposing the AR icon on the image photographed by the image sensor, and add information about the POI to a scrap list based on an input to the AR icon.

20 Claims, 12 Drawing Sheets

(56) References Cited

U.S. PATENT DOCUMENTS

| | | | | |
|---|---|---|---|---|
| 2011/0193985 A1* | 8/2011 | Inoue | .................... | G06T 7/344 |
| | | | | 348/222.1 |
| 2012/0038668 A1* | 2/2012 | Kim | ................ | G06T 11/60 |
| | | | | 345/633 |
| 2012/0038669 A1* | 2/2012 | Lee | ................ | G06T 19/006 |
| | | | | 345/633 |
| 2012/0075341 A1* | 3/2012 | Sandberg | ............. | G06F 3/147 |
| | | | | 345/633 |
| 2012/0231839 A1* | 9/2012 | Seo | .............. | H04M 1/72427 |
| | | | | 455/556.1 |
| 2013/0073988 A1* | 3/2013 | Groten | .............. | G06F 3/147 |
| | | | | 715/753 |
| 2013/0150124 A1* | 6/2013 | Kim | ................ | G06F 16/54 |
| | | | | 455/556.1 |
| 2015/0302650 A1* | 10/2015 | Abdelmoati | ......... | G06F 3/041 |
| | | | | 345/633 |
| 2017/0039695 A1* | 2/2017 | Castro | ................. | G06T 11/60 |
| 2018/0144552 A1* | 5/2018 | Ishikawa | ............. | G06F 3/012 |
| 2019/0035152 A1* | 1/2019 | Kazansky | ........... | G06T 19/006 |
| 2019/0172263 A1* | 6/2019 | Li | .................... | G06F 3/04817 |
| 2019/0244436 A1* | 8/2019 | Stansell | ............. | G06T 19/20 |
| 2020/0258144 A1* | 8/2020 | Chaturvedi | ........... | G06T 7/50 |
| 2020/0273251 A1* | 8/2020 | Palos | .................... | G06T 7/70 |
| 2020/0334285 A1* | 10/2020 | Veitch | ................. | G06F 16/54 |
| 2021/0097768 A1* | 4/2021 | Malia | ................. | G06F 3/0488 |
| 2021/0102820 A1* | 4/2021 | Le | ..................... | G06F 1/1694 |
| 2021/0158622 A1* | 5/2021 | Leelaphattarakij | ........................ | |
| | | | | G06F 3/04815 |
| 2021/0390311 A1* | 12/2021 | Barron | ............... | G06Q 30/0627 |
| 2021/0406543 A1* | 12/2021 | Drummond | .......... | G06T 19/006 |
| 2021/0407211 A1* | 12/2021 | Yi | ..................... | G06T 19/006 |
| 2022/0101610 A1* | 3/2022 | Anvaripour | ........... | H04W 4/029 |

* cited by examiner

USER EQUIPMENT AND CONTROL METHOD FOR THE SAME

CROSS-REFERENCE TO RELATED APPLICATIONS

This application claims the benefit of Korean Patent Application No. 10-2021-0017718, filed on Feb. 8, 2021, which application is hereby incorporated herein by reference.

TECHNICAL FIELD

The disclosure relates to a user equipment and a control method for the same.

BACKGROUND

Recently, services using augmented reality (AR) are increasing. A user may be provided with a more lively service than before through an augmented reality service by using a user equipment (UE).

For example, a map and navigation service using an AR technology may display an AR image of a point of interest (POI) related to various types of businesses such as a restaurant, a café, a grocery store, etc., at the location of the corresponding POI. That is, when a user photographs a POI using a UE, an AR image of the POI which is superimposed on the photographed image may be displayed at the location of the POI.

SUMMARY

The disclosure relates to a user equipment and a control method for the same. Particular embodiments relate to a user equipment providing augmented reality and a control method for the same.

An embodiment of the disclosure provides a user equipment (UE) and a control method for the same that may provide a user interface to enable information on a point of interest (POI) to be more conveniently added to a scrap list, and provide various types of posts about the POI.

Additional embodiments of the disclosure will be set forth in part in the description which follows and, in part, will be obvious from the description, or may be learned by practice of the disclosure.

According to an embodiment of the disclosure, there is provided a user equipment including an image sensor, a user interface configured to display an image photographed by the image sensor and receive a user input, a location detection sensor configured to detect a location of the user equipment, and a controller configured to identify a point of interest (POI) located in a shooting direction of the image sensor based on an output of the location detection sensor, control the user interface to display an augmented reality (AR) icon corresponding to the POI by superimposing the AR icon on the image photographed by the image sensor, and add information on the POI to a scrap list based on a user's input to the AR icon.

The user's input to the AR icon is double tapping the AR icon.

The controller is configured to control the user interface to display a scrap button and add the information on the POI to the scrap list based on a user's input to the scrap button.

The controller is configured to control the user interface to display the AR icon of the POI by superimposing the AR icon on the image photographed by the image sensor based on a user's selection of a scrap display filter, the POI being included in the scrap list.

The controller is configured to control the user interface to display information on each of a plurality of POIs included in the scrap list based on a user's selection of a scrap list display.

The controller is configured to control the user interface to display information on at least one POI corresponding to a business type filter among the plurality of POIs included in the scrap list based on a user's selection of the business type filter.

The controller is configured to control the user interface to display the information on each of the plurality of POIs in an order of closest to the user equipment.

When adding the information on the POI to the scrap list, the controller is configured to add a preference value for the POI to the information on the POI, and control the user interface to display the information on each of the plurality of POIs in an order of highest preference value.

The user equipment further includes a communicator, wherein the controller is configured to control the communicator to transmit the information on the POI included in the scrap list to an external device.

The user equipment further includes a communicator, wherein the controller is configured to control the user interface to display a list of surrounding POIs located in a vicinity of the user equipment based on a user's input to a create post button, and when a selection of a first POI from the list of surrounding POIs and a post about the first POI is input, control the communicator to transmit, to an external server, post information including an AR image of the post and location information of the first POI.

The controller is configured to control the user interface to display the AR image of the post by superimposing the AR image of the post about a location of the first POI in the image photographed by the image sensor.

The controller is configured to control the user interface to display a list of posts about the POI based on a user's input to the AR icon corresponding to the POI.

The controller is configured to control the communicator to transmit the post information to an external device.

According to an embodiment of the disclosure, there is provided a control method of a user equipment including an image sensor, a user interface and a location detection sensor, the control method including identifying a POI located in a shooting direction of the image sensor based on an output of the location detection sensor, controlling the user interface to display an AR icon corresponding to the POI by superimposing the AR icon on an image photographed by the image sensor, and adding information on the POI to a scrap list based on a user's input to the AR icon.

The user's input to the AR icon is double tapping the AR icon.

The control method further includes controlling the user interface to display a scrap button and adding the information on the POI to the scrap list based on a user's input to the scrap button.

The control method further includes controlling the user interface to display the AR icon of the POI by superimposing the AR icon on the image photographed by the image sensor based on a user's selection of a scrap display filter, the POI being included in the scrap list.

The control method further includes controlling the user interface to display information on each of a plurality of POIs included in the scrap list based on a user's selection of a scrap list display.

The control method further includes controlling the user interface to display information on at least one POI corresponding to a business type filter among the plurality of POIs included in the scrap list based on a user's selection of the business type filter.

The control method further includes controlling the user interface to display the information on each of the plurality of POIs in an order of closest to the user equipment.

The control method further includes, when adding the information on the POI to the scrap list, adding a preference value for the POI to the information on the POI, and controlling the user interface to display the information on each of the plurality of POIs in an order of highest preference value.

The user equipment further includes a communicator, and the control method further includes controlling the communicator to transmit the information on the POI included in the scrap list to an external device.

The user equipment further includes a communicator, and the control method further includes displaying a list of surrounding POIs located in a vicinity of the user equipment based on a user's input to a create post button, and when a selection of a first POI from the list of surrounding POIs and a post about the first POI is input, controlling the communicator to transmit, to an external server, post information including an AR image of the post and location information of the first POI.

The control method further includes controlling the user interface to display the AR image of the post by superimposing the AR image of the post on a location of the first POI in the image photographed by the image sensor.

The control method further includes controlling the user interface to display a list of posts about the POI based on a user's input to the AR icon corresponding to the POI.

The control method further includes controlling the communicator to transmit the post information to an external device.

BRIEF DESCRIPTION OF THE DRAWINGS

These and/or other embodiments of the disclosure will become apparent and more readily appreciated from the following description of exemplary embodiments, taken in conjunction with the accompanying drawings, in which.

DETAILED DESCRIPTION OF ILLUSTRATIVE EMBODIMENTS

Figure 1:
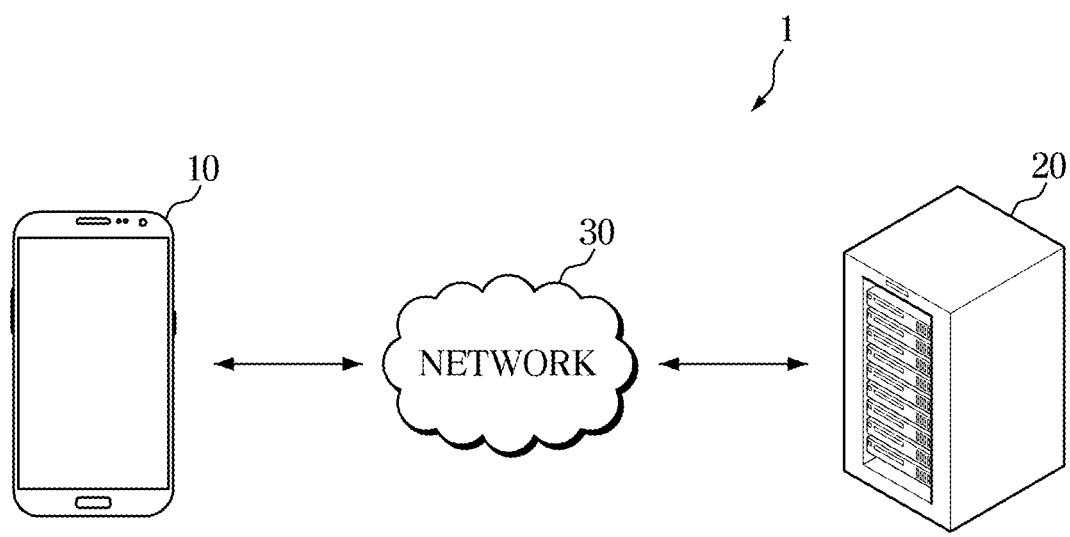
FIG. 1 illustrates a point of interest (POI) display system according to an embodiment.

Like reference numerals throughout the specification denote like elements. Also, this specification does not describe all the elements according to embodiments of the disclosure, and descriptions well-known in the art to which the disclosure pertains or overlapped portions are omitted.

It will be understood that when an element is referred to as being "connected" to another element, it can be directly or indirectly connected to the other element, wherein the indirect connection includes "connection" via a wireless communication network.

It will be understood that the term "include" when used in this specification, specifies the presence of stated features, integers, steps, operations, elements, and/or components, but does not preclude the presence or addition of one or more other features, integers, steps, operations, elements, components, and/or groups thereof.

It is to be understood that the singular forms are intended to include the plural forms as well, unless the context clearly dictates otherwise.

Further, the terms such as "~part", "~device", "~block", "~member", "~module", and the like may refer to a unit for processing at least one function or act. For example, the terms may refer to at least one process processed by at least one hardware, such as field-programmable gate array (FPGA)/application specific integrated circuit (ASIC), software stored in memories or processors.

Reference numerals used for method steps are just used for convenience of explanation, but not to limit an order of the steps. Thus, unless the context clearly dictates otherwise, the written order may be practiced otherwise.

Hereinafter, an embodiment of a user equipment (UE) and a control method for the same according to embodiments of the disclosure will be described in detail with reference to the accompanying drawings.

FIG. 1 illustrates a point of interest (POI) display system according to an embodiment.

Referring to FIG. 1, the POI display system 1 includes a UE 10, a server 20 and a network 30. The UE 10 displays an augmented reality (AR) image of a POI, the server 20 manages identification information for each POI and a post database for each POI, and the network 30 provides communication between the UE 10 and the server 20.

In this instance, the POI may correspond to stores of various types of businesses such as restaurants, cafes and grocery stores. However, a type of POI is not limited to a store, as long as it corresponds to a place, such as a tourist destination, a public office, and the like.

Also, the identification information is information for identifying a POI, and may include location information of the POI, an AR icon of the POI, detailed information of the POI such as a name of a store, an advertisement (a logo, a signboard, etc.), an address, opening hours, a telephone number, a congestion level, user ratings, and the like.

In addition, the post database may store post information on posts created by users about the POI, and the post information may include location information of the POI and an AR image (photos, videos, text, etc.) of a post.

According to an embodiment, the UE 10 may display an AR icon of a POI located in a shooting direction of a camera on a display.

That is, the UE 10 may identify the POI located in the shooting direction of the camera based on location information of the UE 10 and location information of the POI, and display the AR icon of the POI by superimposing the AR icon on an image photographed by the camera. In this instance, the location information of the POI and the AR icon of the POI are included in identification information of the POI.

According to an embodiment, the UE 10 may add the identification information of the POI to a scrap list based on a user's input (e.g. double tapping) to the AR icon or a user's input to a scrap button, to enable a user to more conveniently add the identification information of the POI to the scrap list. Adding the identification information of the POI to the scrap list is described in greater detail later.

According to an embodiment, when receiving a user input for posting the POI, the UE 10 may identify post information including the location information of the POI and an AR image of the post and transmit the post information to the server 20, to add the post information to the post database of the POI in the server 20. Identifying the post information on the POI is described in greater detail later.

According to an embodiment, the server 20 may provide the UE 10 with identification information for each POI and a post database for each POI, receive post information from the UE 10 and store the post information in a post database of a corresponding POI.

The POI display system 1 has been described above. Hereinafter, a configuration of the UE 10 is described in greater detail.

Figure 2:
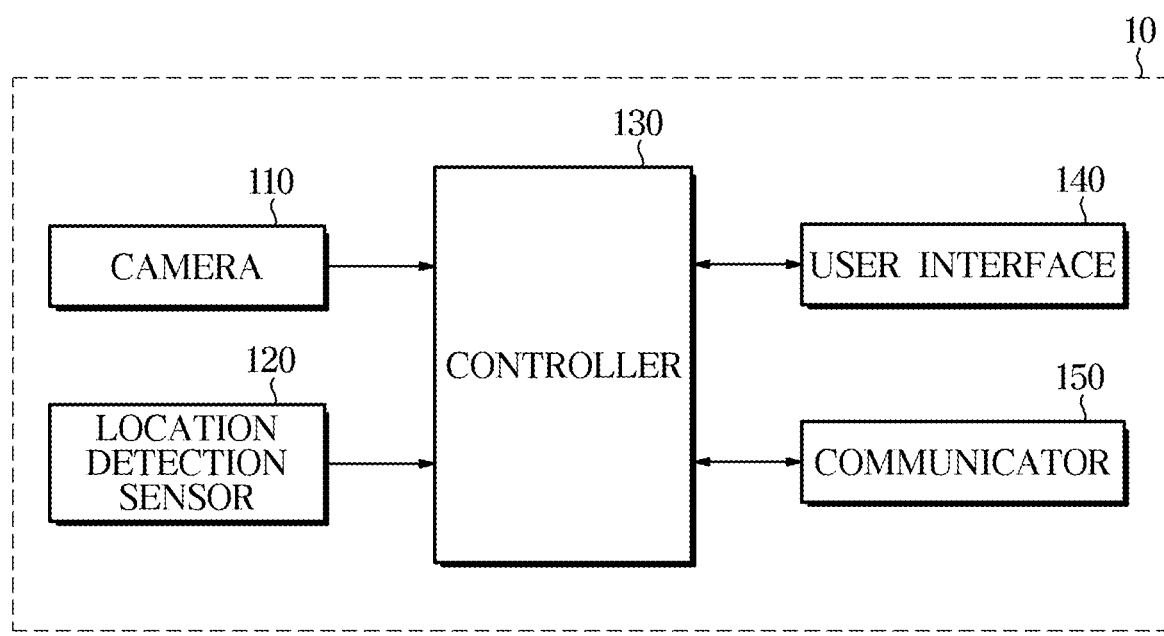
FIG. 2 is a control block diagram illustrating a user equipment (UE) according to an embodiment.

FIG. 2 is a control block diagram illustrating the UE 10 according to an embodiment.

Referring to FIG. 2, according to an embodiment, the UE 10 includes a camera 110, a location detection sensor 120, a controller 130, a user interface 140 and a communicator 150. The controller 130 adds information on a POI to a scrap list based on a user's input and identifies post information on the POI based on a user's input. The user interface 140 displays an image photographed by the camera 110 and receives a user input. The communicator 150 communicates with the server 20.

According to an embodiment, the camera 110 may be provided on a front and/or rear of the UE 10 to acquire the image. The camera 110 may be provided as a known type of image sensor, and a type of the camera 110 is not limited.

According to an embodiment, the location detection sensor 120 may detect a location of the UE 10. For example, the location detection sensor 120 may identify the location of the UE 10 by receiving a global positioning system (GPS) signal. Also, the location detection sensor 120 may detect a shooting direction of the camera 110 by detecting a direction, an inclination, etc., of the UE 10.

According to an embodiment, the controller 130 may add identification information of the POI to a scrap list based on a user's input (e.g. double tapping) to an AR icon or a user's input to a scrap button, to enable a user to more conveniently add the identification information of the POI to the scrap list. Adding the identification information of the POI to the scrap list is described in greater detail later.

According to an embodiment, when receiving a user input for posting the POI, the controller 130 may identify the post information including location information of the POI and an AR image of a post and control the communicator 150 to transmit the post information to the server 20. Through the operation above, the UE 10 may add the post information to a database of the POI in the server 20. Identifying the post information on the POI is described in greater detail later.

The controller 130 may include at least one memory storing a program for performing the aforementioned operations and operations described below, and at least one processor for implementing a stored program. When a plurality of memories and processors are provided, the plurality of memories and processors may be integrated into one chip or provided in physically separated locations.

According to an embodiment, the user interface 140 may include a display and an input part that receives a user input. The display may be provided on a front of the UE 10 and display an image photographed by the camera 110. Also, the display may be provided as a known type of display module, and be implemented as a touch screen provided integrally with the input part.

According to an embodiment, the communicator 150 may communicate with the server 20, receive identification information for each POI and a post database of the POI from the server 20 and transmit the post information of the POI. Also, the communicator 150 may be provided as a known type of wireless communication module.

The configuration of the UE 10 has been described above. Hereinafter, adding the identification information of the POI to the scrap list is described in greater detail.

Figure 3:
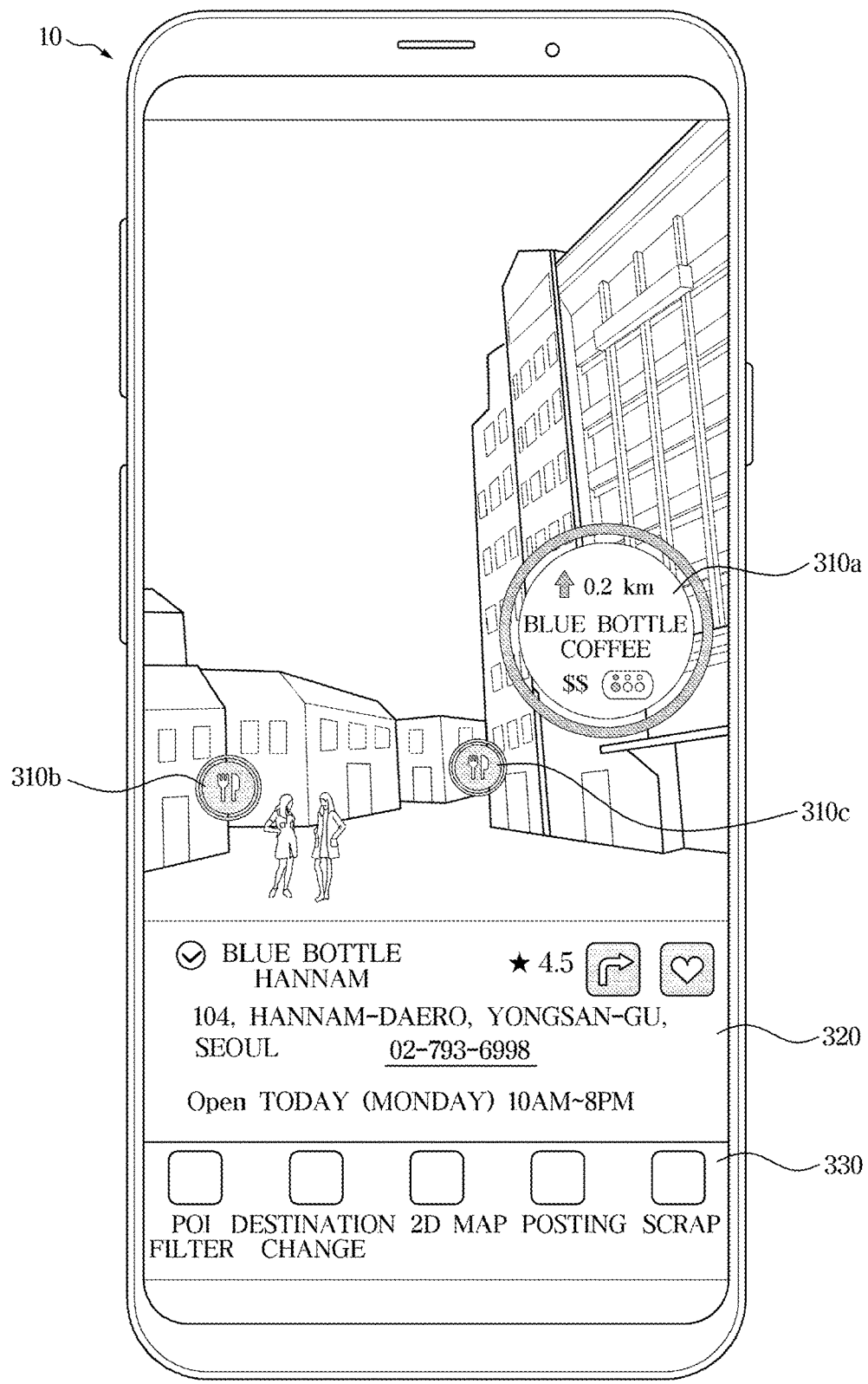
FIG. 3 is a diagram illustrating an example where a UE photographs a POI according to an embodiment.
Figure 4:
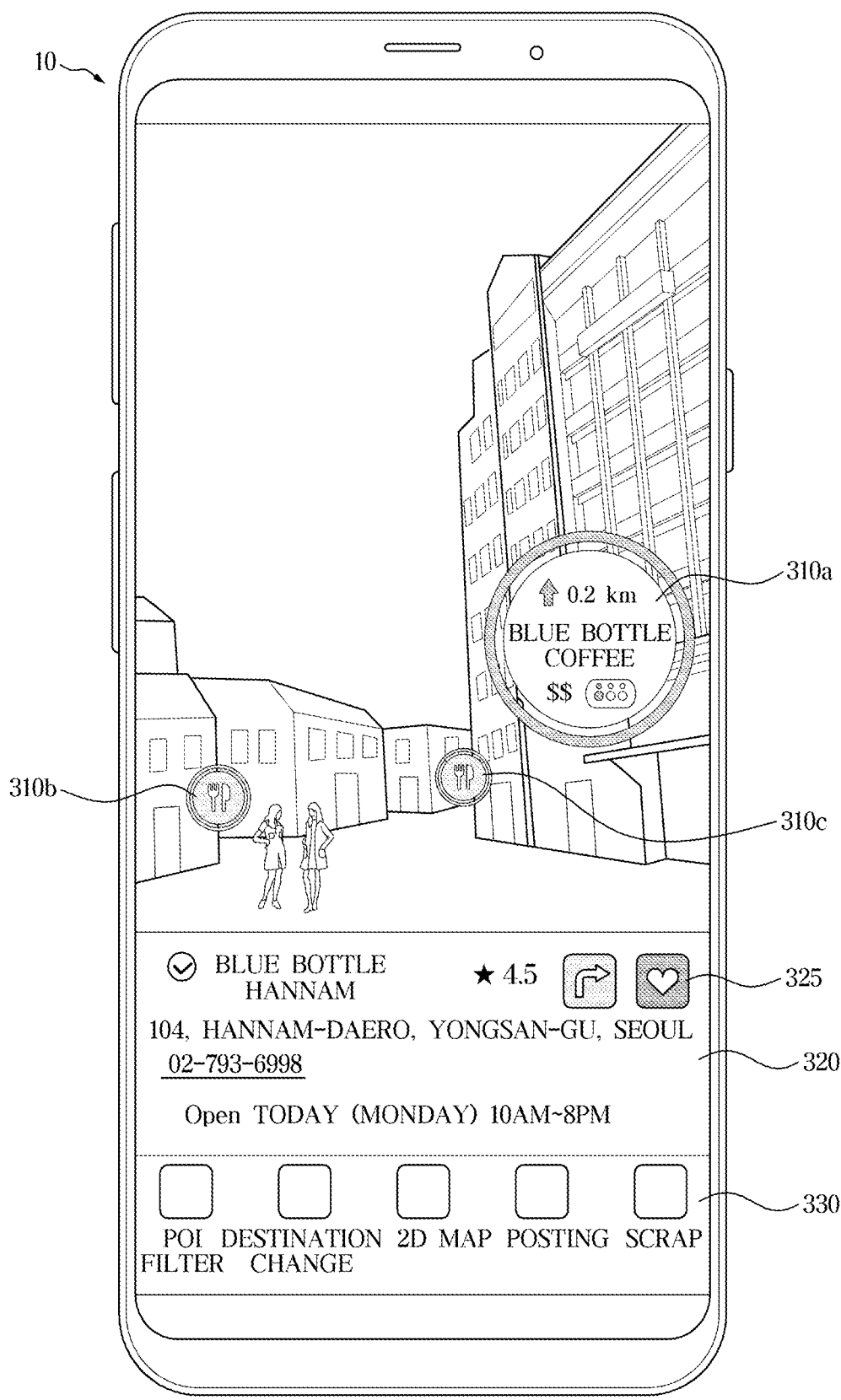
FIG. 4 is a diagram illustrating an example where a UE receives an input for scrapping a POI according to an embodiment.
Figure 5:
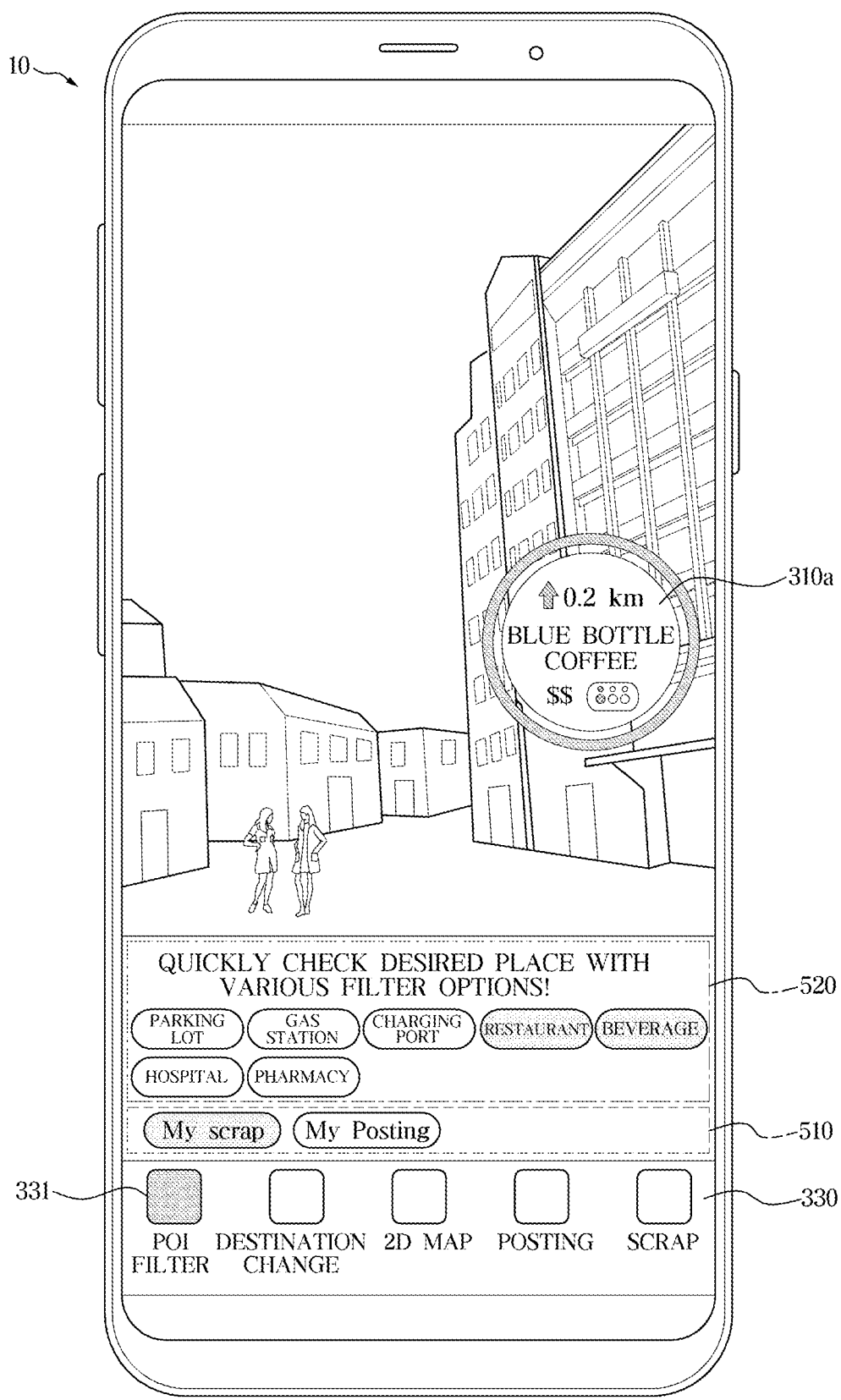
FIG. 5 is a diagram illustrating an example where a UE displays an augmented reality (AR) icon of a POI included in a scrap list according to an embodiment.
Figure 6:
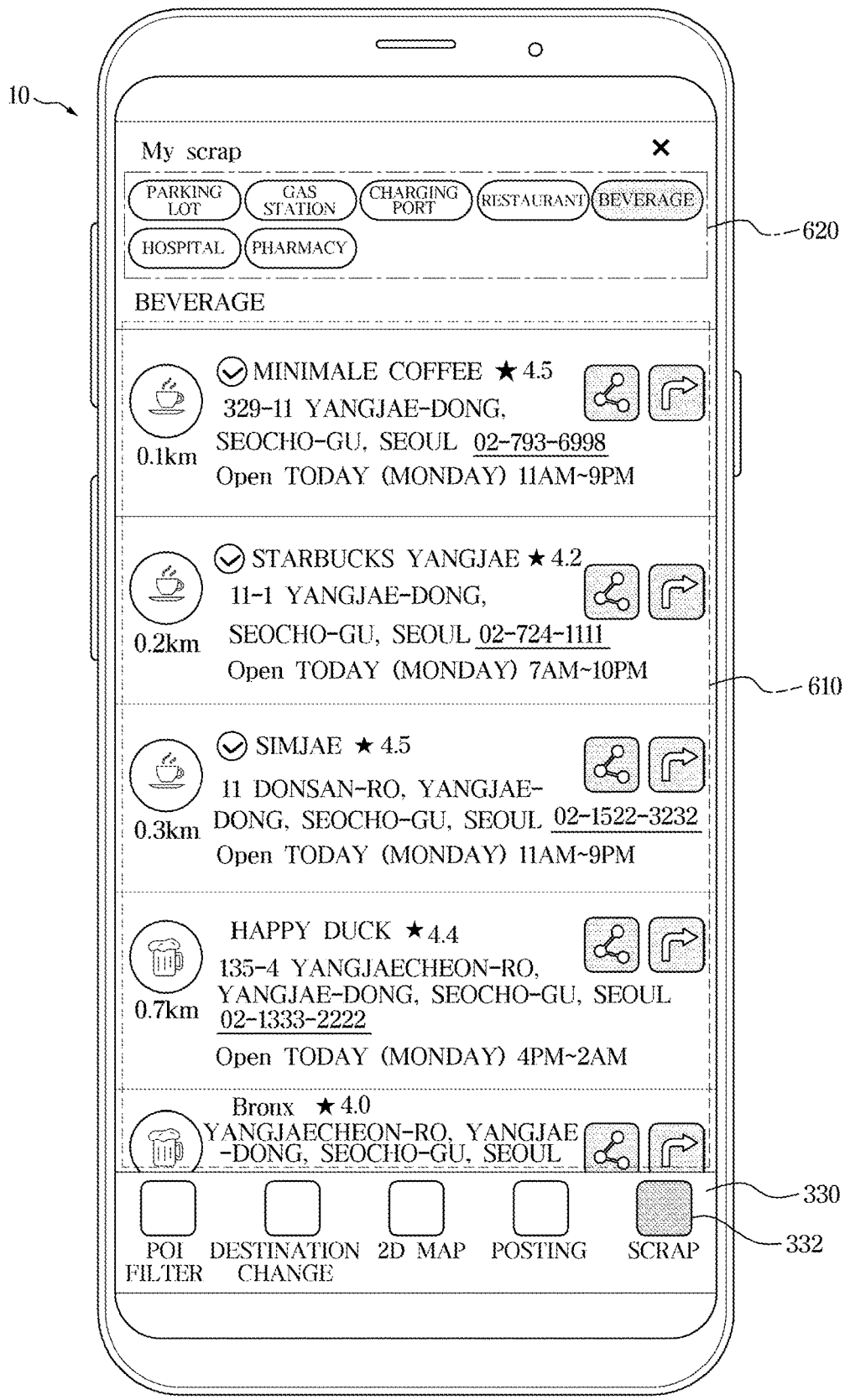
FIG. 6 is a diagram illustrating an example where a UE displays a scrap list according to an embodiment.

FIG. 3 is a diagram illustrating an example where the UE 10 photographs a POI according to an embodiment. FIG. 4 is a diagram illustrating an example where the UE 10 receives an input for scrapping a POI according to an embodiment. FIG. 5 is a diagram illustrating an example where the UE 10 displays an AR icon of a POI included in a scrap list according to an embodiment. FIG. 6 is a diagram illustrating an example where the UE 10 displays a scrap list according to an embodiment.

Referring to FIG. 3, according to an embodiment, the UE 10 may display an AR icon 310 of a POI located in a shooting direction of the camera 110 on the user interface 140.

That is, the UE 10 may identify the POI located in the shooting direction of the camera 110 based on location information of the POI and location information of the UE 10 according to an output of the location detection sensor 120, and display the AR icon 310 of the POI by superimposing the AR icon 310 on an image photographed by the camera 110. In this instance, the location information of the POI and the AR icon 310 of the POI are included in identification information of the POI.

According to an embodiment, the UE 10 may display an AR icon 310*a* of the POI located closest to the UE 10 differently from AR icons 310*b* and 310*c* of other POIs. Specifically, the UE 10 may control the user interface 140 to include more information in the AR icon 310*a* of the POI located closest to the UE 10. For instance, the AR icons 310*b* and 310*c* of other POIs display a single piece of information (e.g. a type of business), whereas the AR icon 310*a* of the POI located closest to the UE 10 displays a plurality of pieces of information (e.g. a street name, a name of a store, a logo, a signboard, a congestion level, a price range, whether to operate a store, and the like).

According to an embodiment, the UE 10 may display detailed information 320 of the POI, and display a menu selection tab 330 for selecting a menu. In this instance, according to an embodiment, the UE 10 may display the detailed information 320 of the POI closest to the UE 10.

Referring to FIG. 4, according to an embodiment, the UE 10 may display a scrap button 325, and add the identification information of the POI to a scrap list based on a user's input to the scrap button 325. Through the operation above, a user may add the identification information of the POI to the scrap list by single tapping on the scrap button 325, and thereby may store the identification information of the POI more conveniently.

Also, according to an embodiment, the UE 10 may add the identification information of the POI to the scrap list based on a user's input to the AR icon 310. For example, the user's input to the AR icon 310 may be double tapping the AR icon 310. Through the operation above, the user may add the identification information of the POI to the scrap list by simple tapping on the AR icon 310, and thereby may store the identification information of the POI more conveniently.

Referring to FIG. 5, according to an embodiment, the UE 10 may display the AR icon 310 of the POI included in the scrap list by superimposing the AR icon 310 on the image photographed by the camera 110 based on a user's selection of a scrap display filter. Through the operation above, the user may check the POI that the user has scrapped on the user interface 140.

Specifically, when receiving a user's input to a POI filter menu 331 and a user's selection of a 'my scrap' from the 'my scrap' and 'my posting' section 510, the UE 10 may display the AR icon 310a of the POI included in the scrap list by superimposing the AR icon 310a on the image photographed by the camera 110.

Also, according to an embodiment, when receiving a user's selection on a type of business in a business type filter section 520, the UE 10 may display the AR icon 310 only of the POI, corresponding to the selected type of business from POIs included in the scrap list, by superimposing the AR icon 310 on the image photographed by the camera 110.

Referring to FIG. 6, according to an embodiment, the UE 10 may display information on each of a plurality of POIs included in the scrap list based on a user's selection of a scrap list display. Through the operation above, the user may check information on the POI that the user has scrapped.

Specifically, when receiving a user's input to a scrap list display menu 332, the UE 10 may display information 610 on each of the plurality of POIs included in the scrap list.

In this instance, as shown in FIG. 6, the information 610 on each of the plurality of POIs included in the scrap list may be displayed in an order of closest to the UE 10 based on a control of the controller 130.

According to an embodiment, the information 610 on each of the plurality of POIs may be displayed in an order of highest preference value. For instance, when adding identification information of a POI to the scrap list, the UE 10 may receive a preference value for the POI from the user and add the preference value to the identification information.

Also, according to an embodiment, the UE 10 may display information on at least one POI corresponding to a business type filter among the plurality of POIs included in the scrap list based on a user's selection of the business type filter in a business type filter section 620. Through the operation above, the user may check information on a POI corresponding to the selected business type from the POIs that the user has scrapped.

Also, according to an embodiment, the UE 10 may transmit the identification information to an external device to share the identification information of the POI included in the scrap list with the external device. For example, the UE 10 may transmit the identification information of the POI to a social networking service (SNS) server or a terminal of an SNS user. In addition, the UE 10 may check a terminal of a user who subscribed to a service through the server 20, and transmit the identification information of the POI to the terminal of the user who subscribed to the service.

Adding the identification information of the POI to the scrap list has been described above. Hereinafter, identifying post information of the POI is described in detail.

Figure 7:
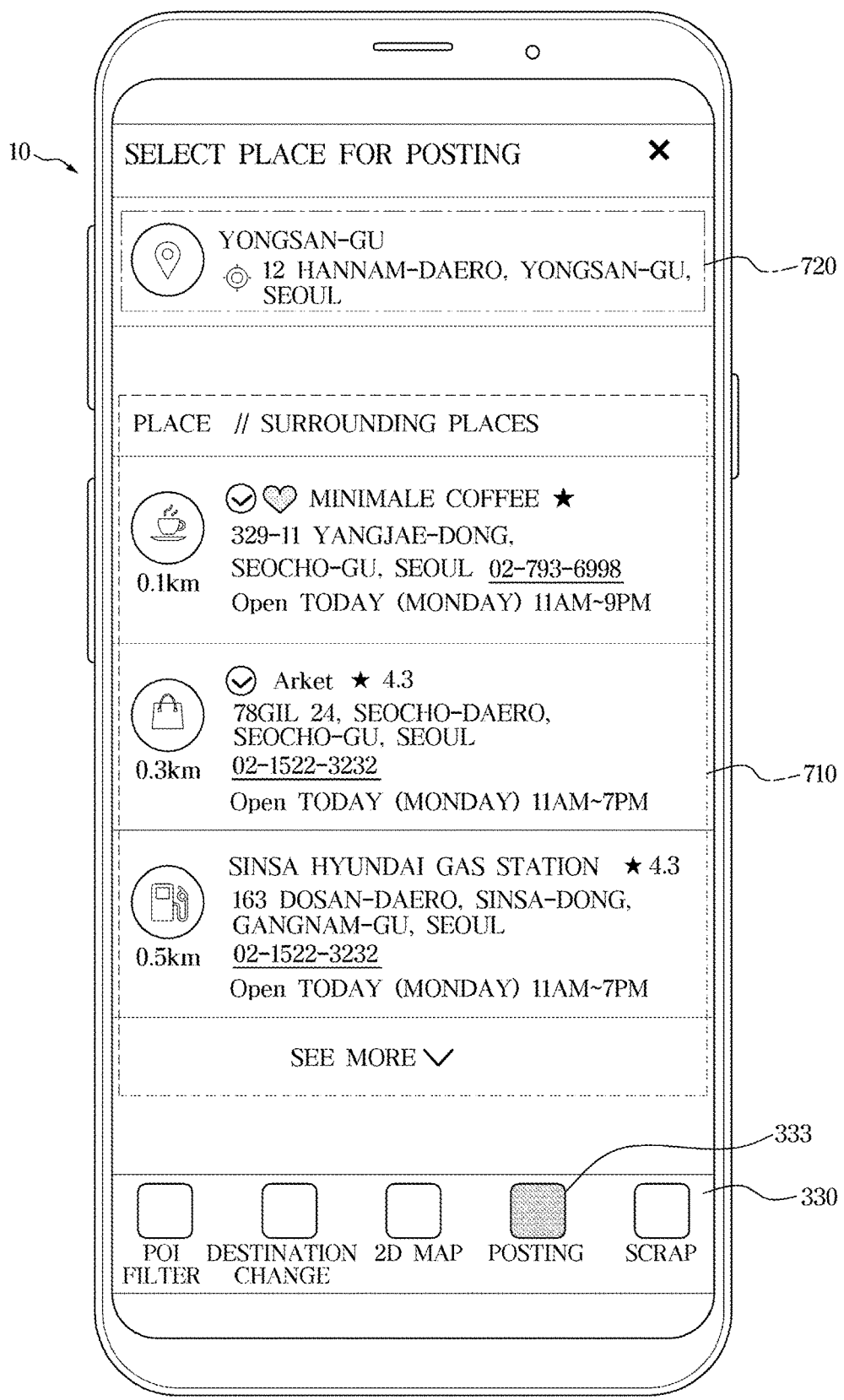
FIG. 7 is a diagram illustrating an example where a UE receives a user's selection on a POI for inputting a post according to an embodiment.
Figure 8:
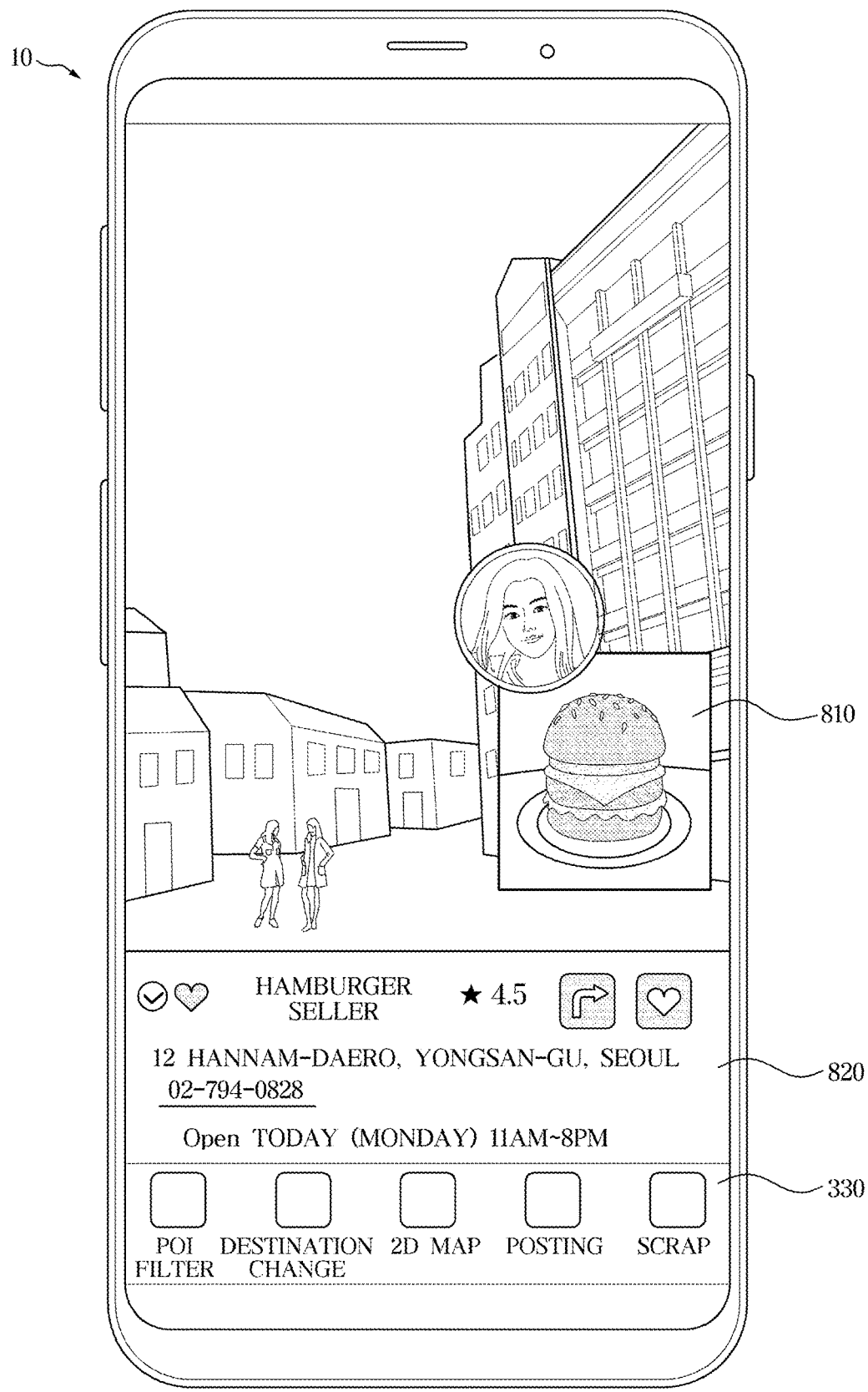
FIG. 8 is a diagram illustrating an example where a UE displays an AR image of a post according to an embodiment.
Figure 9:
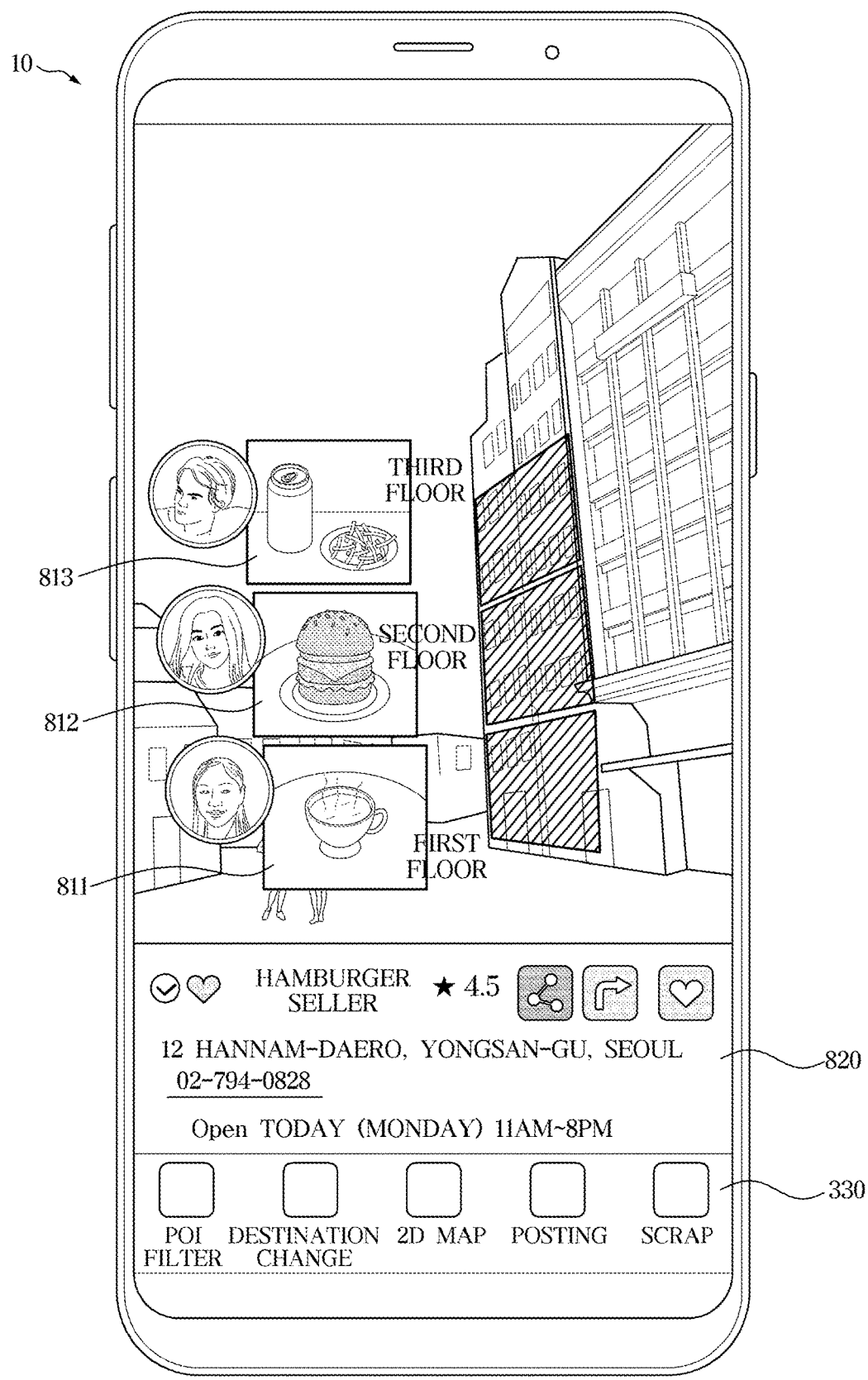
FIG. 9 is a diagram illustrating an example where a UE displays an AR image of a post by reflecting actual surrounding information according to an embodiment.
Figure 10:
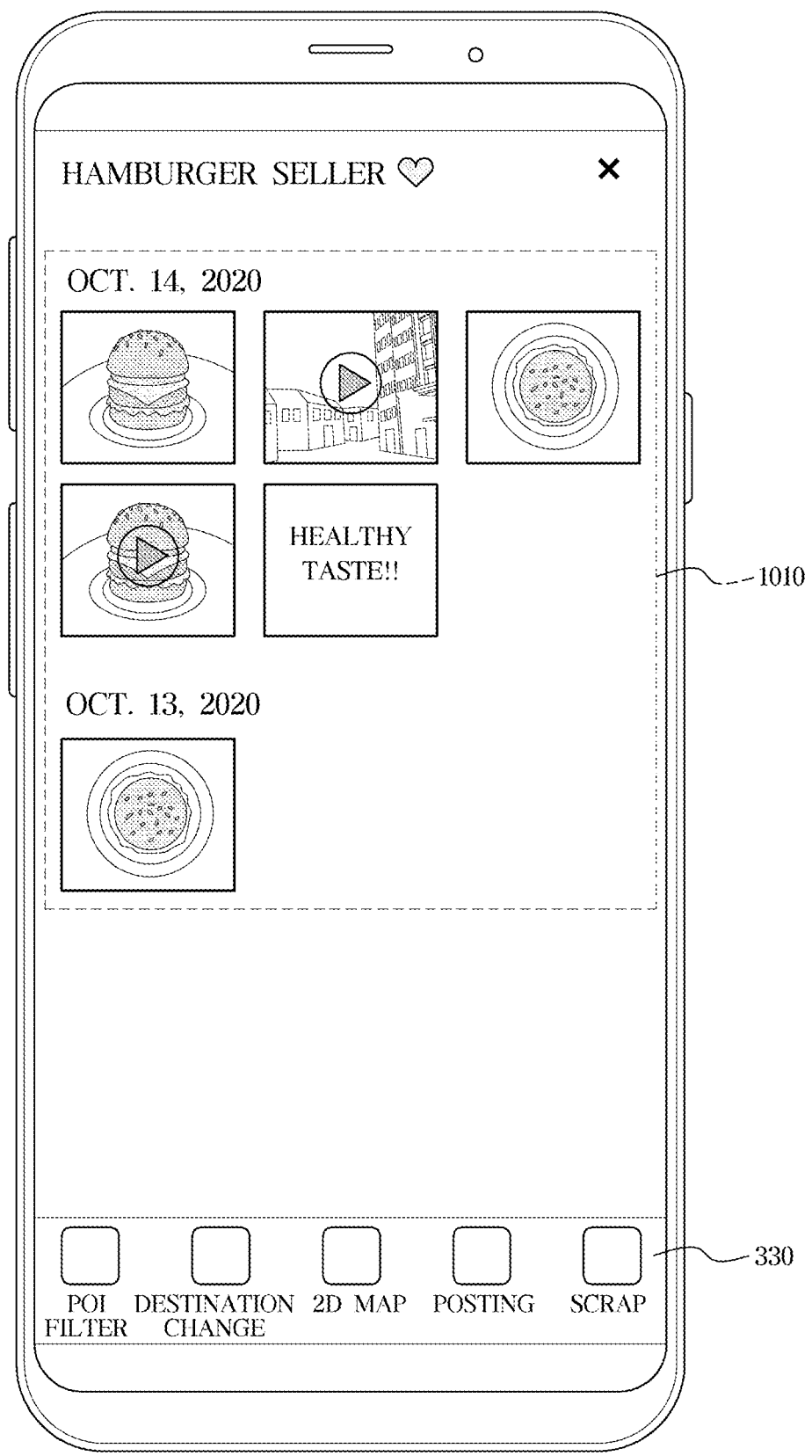
FIG. 10 is a diagram illustrating an example where a UE displays a list of posts about a POI according to an embodiment.

FIG. 7 is a diagram illustrating an example where the UE 10 receives a user's selection on a POI for inputting a post according to an embodiment. FIG. 8 is a diagram illustrating an example where the UE 10 displays an AR image of a post according to an embodiment. FIG. 9 is a diagram illustrating an example where the UE 10 displays an AR image of a post by reflecting actual surrounding information according to an embodiment. FIG. 10 is a diagram illustrating an example where the UE 10 displays a list of posts about a POI according to an embodiment.

Referring to FIG. 7, according to an embodiment, the UE 10 may display a list 710 of surrounding POIs located in a vicinity of the UE 10 based on a user's input to a create post button (a posting menu) 333.

In this instance, the UE 10 may receive a user's selection of a first POI from the list 710 of the surrounding POIs. Here, the first POI is subject to creating a post.

Also, according to an embodiment, the UE 10 may receive a user's selection of current location information 720 of the UE 10. In this instance, a current location of the UE 10 may be identified as the first POI which is subject to creating a post.

When a post about the first POI is input from the user, the UE 10 may identify post information and transmit the identified post information to the server 20. Here, the post information includes an AR image of the post and location information of the first POI. Also, the AR image of the post may be provided as various types of posts such as a photo, a video, text, and the like. In addition, the server 20 may add the post information received from the UE 10 to a post database of the first POI, and thereby may enable other users to see the post information.

Referring to FIG. 8, according to an embodiment, the UE 10 may display an AR image 810 of the post by superimposing the AR image 810 on a location of the first POI in the image photographed by the camera 110. That is, the UE 10 may identify the location of the first POI based on the post information, display the AR image 810 of the post by superimposing the AR image 810 on the location of the first POI, and thereby may enable the user to check the post the user has posted.

In this instance, it is illustrated in FIG. 8 that the AR image 810 of the post is a picture of the first POI as an example, but the AR image 810 is not limited thereto. The AR image 810 of the post may be a review text or a video of the first POI.

Also, according to an embodiment, the AR image 810 of the post may include information (e.g. a profile photo) about the user who posted.

Further, according to an embodiment, the UE 10 may display detailed information 820 on the first POI, so that the user may check the first POI selected as the object of creating the post.

Referring to FIG. 9, according to an embodiment, the UE 10 may display AR images 811, 812 and 813 of the post based on actual surrounding information. Specifically, the UE 10 may identify information about the number of floors in each of a plurality of POIs based on location information of POIs included in the post information, and display the AR images 811, 812 and 813 of the post to correspond to the information about the number of floors in each of the plurality of POIs.

That is, the UE 10 may display the AR image 811 of a post about a POI located on a first floor at a bottom, the AR image 812 of a post about a POI located on a second floor in a middle, and the AR image 813 of a post about a POI located on a third floor at a top.

Also, according to an embodiment, the UE 10 may transmit the post information to an external device to share the post information on the first POI with the external device. For instance, the UE 10 may transmit the post information to an SNS server or a terminal of an SNS user. In addition, the UE 10 may check a terminal of a user who subscribed to a service through the server 20, and transmit the post information to the terminal of the user who subscribed to the service.

Referring to FIG. 10, according to an embodiment, the UE 10 may display a list 1010 of posts about the POI based on a user's input to an AR icon corresponding to the POI.

In this instance, each of the posts on the list 1010 about the POI may be provided as a photo, a video or a text, and may be arranged according to a posted order.

Hereinafter, a control method of the UE 10 according to an embodiment of the disclosure is described in detail. The UE 10 according to an embodiment described above may be used in the control method of the UE 10. Accordingly, the description with reference to FIGS. 1 to 10 may be equally applied to the control method of the UE 10.

Figure 11:
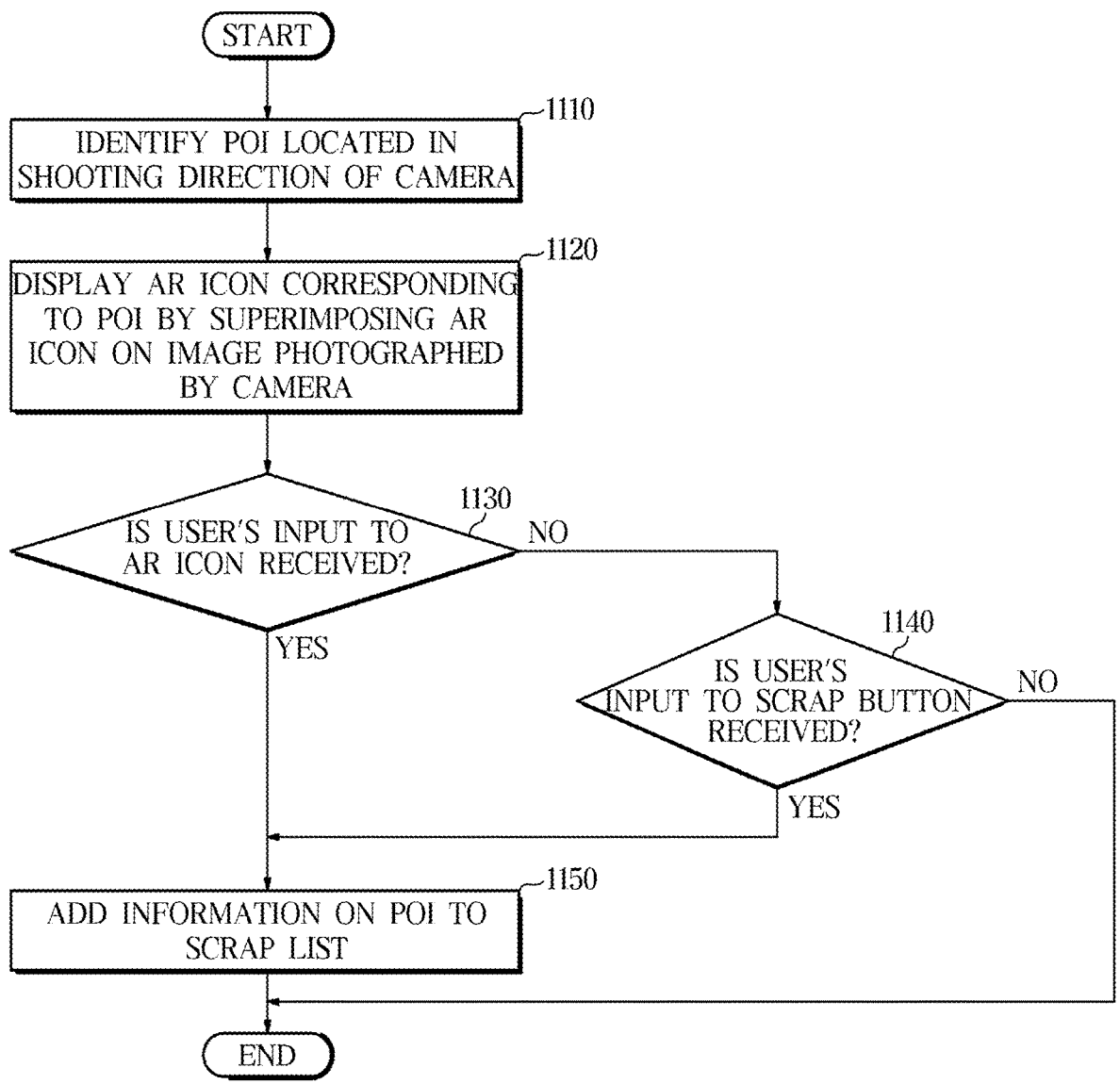
FIG. 11 is a flowchart illustrating operations of adding a POI to a scrap list in a control method of a UE according to an embodiment.

FIG. 11 is a flowchart illustrating operations of adding a POI to a scrap list in a control method of the UE 10 according to an embodiment.

Referring to FIG. 11, according to an embodiment, the UE 10 may identify a POI located in a shooting direction of the camera 110 (1110), and display an AR icon corresponding to the POI by superimposing the AR icon on an image photographed by the camera 110 (1120).

When receiving a user's input to the AR icon (Yes in operation 1130) or a user's input to a scrap button (Yes in operation 1140), the UE 10 may add information on the POI to a scrap list (1150).

That is, the UE 10 may display the scrap button 325, and add identification information of the POI to the scrap list based on the user's input to the scrap button 325. Through the operation above, a user may add the identification information of the POI to the scrap list by single tapping on the scrap button 325, and thereby may store the identification information of the POI more conveniently.

Also, the UE 10 may add the identification information of the POI to the scrap list based on a user's input to the AR icon 310. For example, the user's input to the AR icon 310 may be double tapping the AR icon 310. Through the operation above, the user may add the identification information of the POI to the scrap list by simple tapping on the AR icon 310, and thereby may store the identification information of the POI more conveniently.

Figure 12:
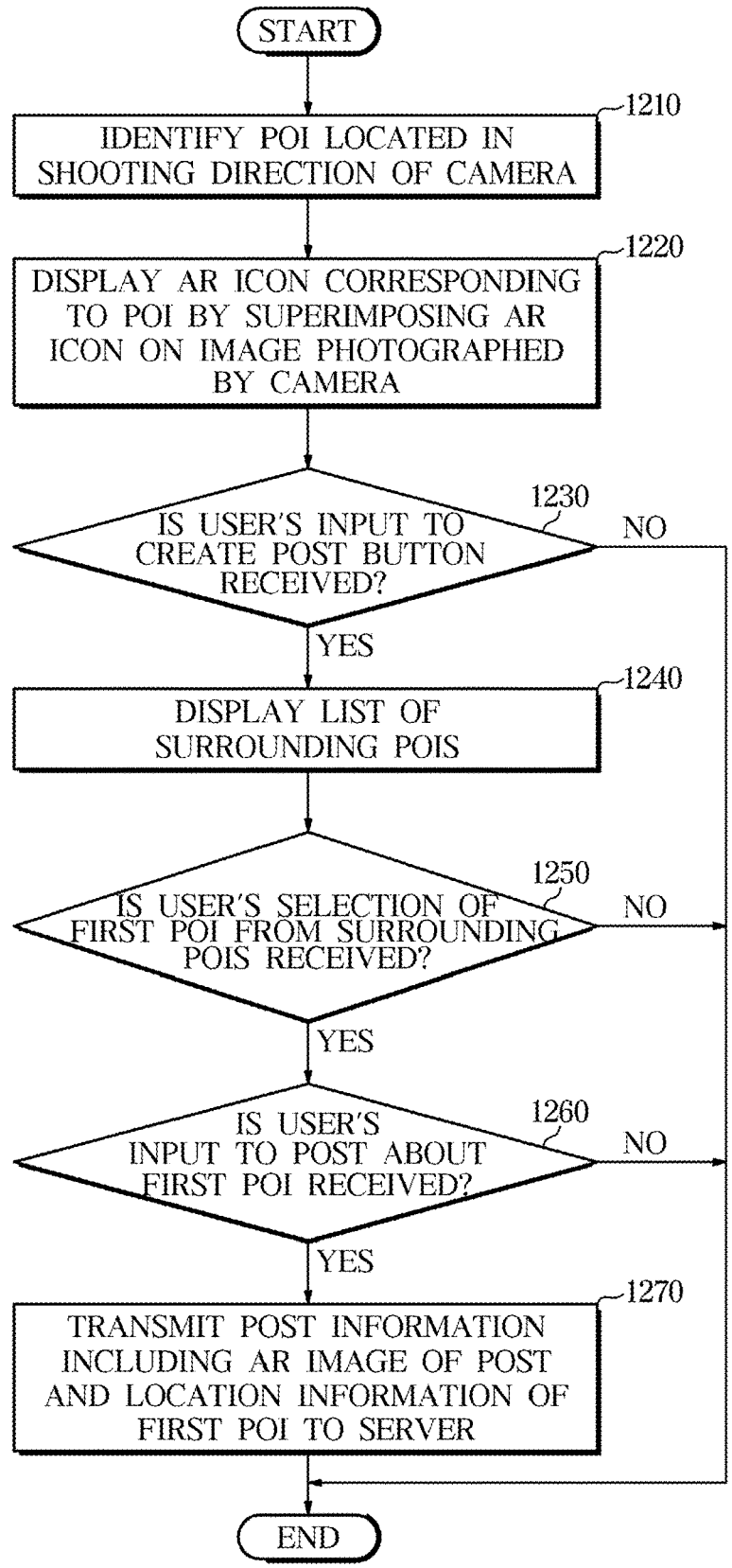
FIG. 12 is a flowchart illustrating operations of identifying a post about a POI in a control method of a UE according to an embodiment.

FIG. 12 is a flowchart illustrating operations of identifying a post about a POI in a control method of the UE 10 according to an embodiment.

Referring to FIG. 12, according to an embodiment, the UE 10 may identify a POI located in a shooting direction of the camera 110 (1210), and display an AR icon corresponding to the POI by superimposing the AR icon on an image photographed by the camera 110 (1220).

According to an embodiment, when receiving a user's input to a create post button (a posting menu) 333 (Yes in operation 1230), the UE 10 may display the list 710 of surrounding POIs located in the vicinity of the UE 10 (1240).

In this instance, when receiving a user's selection of a first POI which is subject to creating a post from the list 710 of the surrounding POIs (Yes in operation 1250), and receiving a post about the first POI from the user (Yes in operation 1260), the UE 10 may transmit post information to the server 20 (1270). Here, the post information includes an AR image of the post and location information of the first POI.

That is, when receiving the post about the first POI which is subject to creating a post, the UE 10 may identify the post information including the AR image of the post and the location information of the first POI, and transmit the identified post information to the server 20. In this instance, the AR image of the post may be provided as various types of posts such as a photo, a video, text, and the like. In addition, the server 20 may add the post information received from the UE 10 to a post database of the first POI, and thereby may enable other users to see the post information.

As is apparent from the above, according to the embodiment of the disclosure, the UE and the control method for the same can provide a user interface to enable information on a POI to be more conveniently added to a scrap list, and provide various types of posts about the POI.

Embodiments can thus be implemented through computer readable code/instructions in/on a medium, e.g., a non-transitory computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), magnetic tapes, magnetic disks, flash memories, and an optical recording medium.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:

1. A user equipment comprising:
   an image sensor;
   a user interface configured to display an image photographed by the image sensor and to receive a user input;
   a location detection sensor configured to detect a location of the user equipment; and
   a controller configured to:
   identify a point of interest (POI) located in a shooting direction of the image sensor based on an output of the location detection sensor;
   control the user interface to display an augmented reality (AR) icon corresponding to the identified POI by superimposing the AR icon on the image photographed by the image sensor; and
   add information about the identified POI to a scrap list among a plurality of POIs based on an input to the AR icon, wherein the controller is configured to control the user interface to display the AR icon of the identified POI by superimposing the AR icon on the image photographed by the image sensor based on a selection of a scrap display filter, and only the AR icon of the identified POI corresponding to the selection of the scrap display filter and corresponding to the shooting direction of the image sensor based on the output of the location detection sensor is superimposed and displayed.

2. The user equipment of claim 1, wherein the input to the AR icon comprises double tapping of the AR icon.

3. The user equipment of claim 1, wherein the controller is configured to control the user interface to display a scrap button and add the information about the identified POI to the scrap list based on an input to the scrap button.

4. The user equipment of claim 1, wherein the controller is configured to control the user interface to display information about each of the plurality of POIs included in the scrap list based on a selection of a scrap list display.

5. The user equipment of claim 4, wherein the controller is configured to control the user interface to display information about at least one POI corresponding to a business type filter among the plurality of POIs included in the scrap list based on a selection of the business t e filter.

6. The user equipment of claim 4, wherein the controller is configured to control the user interface to display the information about each of the plurality of POIs in an order of closest to the user equipment.

7. The user equipment of claim 4, wherein, during addition of the information about the identified POI to the scrap list, the controller is configured to add a preference value for the identified POI to the information about the identified POI, and to control the user interface to display the information about each of the plurality of POIs in an order of highest preference value.

8. The user equipment of claim 1, further comprising a communicator, wherein the controller is configured to control the communicator to transmit the information about the identified POI included in the scrap list to an external device.

9. The user equipment of claim 1, further comprising a communicator, wherein the controller is configured to control the user interface to display a list of surrounding POIs located in a vicinity of the user equipment based on an input to a create post button, and based on a selection of a first POI from the list of surrounding POIs and a post about the first POI being input, to control the communicator to transmit to an external server post information including an AR image of the post and location information of the first POI.

10. The user equipment of claim 9, wherein the controller is configured to control the user interface to display the AR image of the post by superimposing the AR image of the post about a location of the first POI on the image photographed by the image sensor.

11. The user equipment of claim 9, wherein the controller is configured to control the user interface to display a list of posts about the first POI based on an input to the AR icon corresponding to the first POI.

12. The user equipment of claim 9, wherein the controller is configured to control the communicator to transmit the post information to an external device.

13. A control method for a user equipment comprising an image sensor, a user interface, and a location detection sensor, the control method comprising:
 identifying a point of interest (POI) located in a shooting direction of the image sensor based on an output of the location detection sensor;
 controlling the user interface to display an augmented reality (AR) icon corresponding to the POI by superimposing the AR icon on an image photographed by the image sensor;
 adding information about the identified POI to a scrap list among a plurality of POIs based on an input to the AR icon; and
 controlling the user interface to display the AR icon of the identified POI by superimposing the AR icon on the image photographed by the image sensor based on a selection of a scrap display filter, wherein only the AR icon of the identified POI corresponding to the selection of the scrap display filter and corresponding to the shooting direction of the image sensor based on the output of the location detection sensor is superimposed and displayed.

14. The control method of claim 13, wherein the input to the AR icon comprises double tapping of the AR icon.

15. The control method of claim 13, further comprising:
 controlling the user interface to display a scrap button; and
 adding the information about the identified POI to the scrap list based on an input to the scrap button.

16. The control method of claim 13, further comprising controlling the user interface to display information about each of the plurality of POIs included in the scrap list based on a selection of a scrap list display.

17. The control method of claim 16, further comprising controlling the user interface to display information about at least one POI corresponding to a business type filter among the plurality of POIs included in the scrap list based on a selection of the business type filter.

18. The control method of claim 16, further comprising controlling the user interface to display the information about each of the plurality of POIs in an order of closest to the user equipment.

19. A system comprising:
 a user interface configured to display an image photographed by an image sensor and to receive a user input; and
 a controller configured to:
  receive the image photographed by the image sensor;
  receive a location of user equipment from a location detection sensor;
  identify a point of interest (POI) located in a shooting direction of the image sensor based on an output of the location detection sensor;
  control the user interface to display an augmented reality (AR) icon corresponding to the identified POI by superimposing the AR icon on the image photographed by the image sensor; and
  add information about the identified POI to a scrap list among a plurality of POIs based on an input to the AR icon, wherein the controller is configured to control the user interface to display the AR icon of the identified POI by superimposing the AR icon on the image photographed by the image sensor based on a selection of a scrap display filter, and only the AR icon of the identified POI corresponding to the selection of the scrap display filter and corresponding to the shooting direction of the image sensor based on the output of the location detection sensor is superimposed and displayed.

20. The system of claim 19, wherein the controller is configured to control the user interface to display information about each of the plurality of POIs included in the scrap list based on a selection of a scrap list display.

* * * * *

UNITED STATES PATENT AND TRADEMARK OFFICE
CERTIFICATE OF CORRECTION

PATENT NO. : 11,625,142 B2
APPLICATION NO. : 17/643107
DATED : April 11, 2023
INVENTOR(S) : Rowoon An It is certified that error appears in the above-identified patent and that said Letters Patent is hereby corrected as shown below:

In the Claims

Claim 5, Column 11, Line 21; delete "t e" and insert --type--.

Signed and Sealed this
Sixteenth Day of May, 2023

Katherine Kelly Vidal
*Director of the United States Patent and Trademark Office*